July 6, 1943. A. D. STEIDINGER 2,323,495
FLUID EXPELLING TIRE ASSEMBLY
Original Filed Sept. 25, 1937

INVENTOR.
Aaron D. Steidinger
BY
Willard D. Eakin
ATTORNEY

Patented July 6, 1943

2,323,495

UNITED STATES PATENT OFFICE 2,323,495

FLUID EXPELLING TIRE ASSEMBLY

Aaron D. Steidinger, Fairbury, Ill.

Original application September 25, 1937, Serial No. 165,705. Divided and this application May 23, 1941, Serial No. 394,826

5 Claims. (Cl. 152—330)

This invention relates to tires of the pneumatic type having provision for removal from the tire of water used in the tire for weighting purposes, one example being the weighting of pneumatic tractor tires with water for the sake of greater traction and reduction of rebound. The present application is a division of my application Ser. No. 165,705, filed September 25, 1937, which matured into Patent No. 2,307,429, January 5, 1943.

For several years water has been used in such tires and it has been desired to remove it completely on occasion, to avoid the necessity of employing other expedients to prevent it from freezing in cold weather, for example, or to lighten the tractor and lessen fuel consumption when putting the tractor to a use not requiring the increased traction.

As the inflating stem is at the inner periphery of the inner tube, the pressure of air overlying the water in the tire can force out the water only down to the level of the junction of the inflating stem with the tube, whether the tire be positioned with the inflating stem at the high or at the low part of the wheel circle, and even though the outflow of water is interrupted from time to time to conduct additional air into the tire to compensate for water displaced from the tire and to keep the tire from going flat.

In spite of the fact that this problem of complete removal of the water from the tire has existed for several years and has been encountered by a great many operators of tractors, the only commonly used expedient for removing the last of the water, so far as I am aware, has been the use of suction pump, with a nipple insertible through the valve-stem. It is of course advantageous to avoid the necessity of having a pump or other special appliance or part readily at hand at the time of evacuating the water, because of their being easily lost or damaged. Also the use of a pump involves the initial cost of the pump and is a slow operation.

The chief objects of my invention are to provide for complete removal of the water without a pump; to avoid the necessity of having a pump or special parts at hand when it is desired to remove the water; to provide for rapid removal of the water; and to provide conveniently for removal of the water without the necessity of either supporting the tire from the axle or permitting it to go flat.

Figure 3:
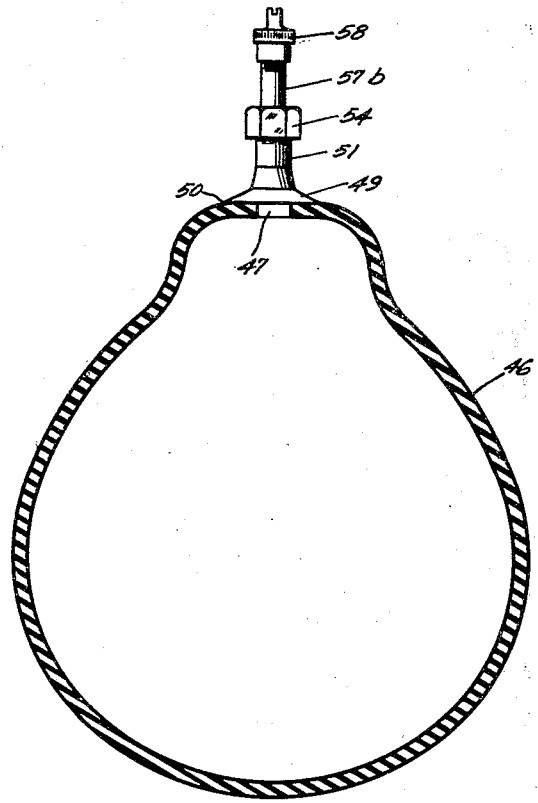
Fig. 3 is a cross-section, with parts in elevation, of the inner tube of Figs. 1 and 2 as it appears when a valve assembly is substituted for the water-venting tube.
Figure 1:
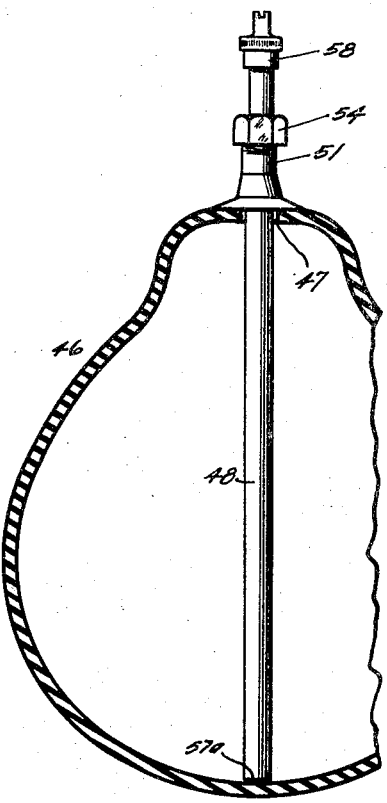
Fig. 1 is a cross-section, with parts in elevation, of an inner tube assembly embodying my invention in its preferred form.
Figure 4:
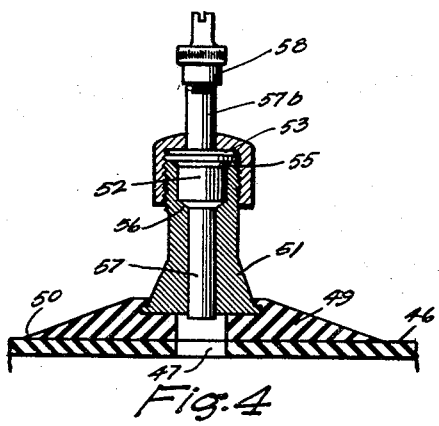
Fig. 4 is a fragmentary longitudinal section, with parts in elevation, of the inner tube of Figs. 1 and 3 as it appears when, as in Fig. 3, a valve assembly is substituted for the water-venting tube.
Figure 2:
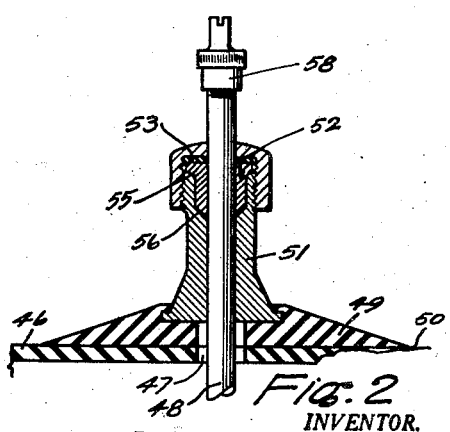
Fig. 2 is a fragmentary longitudinal section, with parts in elevation, of the inner tube of Fig. 1.

I attain the above stated objects by providing a conduit adapted to extend from the exterior to the interior of the tire, through the valve stem, and to be sealed to the valve stem, and to have an open end 57a within the tire cavity and at the lowermost part thereof when the valve stem is at the lowermost part of its orbit, the construction thus being such that compressed air above the water in the tire will drive the water out of the tire, through the said conduit, when the latter is open to the atmosphere.

Preferably, although not necessarily, the portion of the conduit within the tire cavity is flexible, so that its open, water-receiving end will be caused to assume its proper position by the force of gravity, and so that it can remain in position in the tire assembly without interfering with the use of, or damaging, the tire or inner tube in service.

In the accompanying drawing, which shows a preferred embodiment of my present invention, the inner tube 46 of a tire that is to be water-weighted has a hole 47 in its inner peripheral wall through which extends a metal valve-stem 51 which is formed with a packing-gland recess 56 occupied by a packing 52, which may be of rubber or of fibrous packing material, and which is adapted to be crowded against, by a bevel shoulder 55, and to seal against, a metal or rubber pipe 48 when a packing nut 54 is screwed down upon the valve-stem, the metal or rubber pipe 48 thus being sealed to the wall of the inner tube, through the packing member 52 and the valve stem 51. A washer 53 may be interposed between the inner end face of the packing nut 54 and the packing member 52. The usual rubber valve-stem base 49, formed with a feathered outer edge 50, can be employed. The usual valve-stem cap is shown at 58.

This construction is such that the pipe 48, when it is of metal, can be set at a low position for complete evacuation of the water, by the pressure of air above it in the tire, or at a high position to avoid puncture of the inner tube by the lower end of the pipe 48 in service. The upper end portion of the pipe 48 can contain the usual valve "insides."

Alternatively, the pipe 48 can be completely removed, between water-venting operations, and in its place can be employed a through-apertured filler member 57 having the usual valve "insides" in its upper portion 57$^b$.

This embodiment as described provides the advantages that are set out in the above statement of objects and various modifications are possible within the scope of the appended claims.

I claim:

1. A device for venting a weighting liquid from a tire mounted upon a vehicle, said device comprising a conduit adapted to extend through and be sealed to the wall of an inflating-valve stem of a pneumatic-type tire and means for so sealing it, the conduit having a flexible portion adapted to be positioned within the tire cavity.

2. Apparatus for removing liquid from an inflatable tire having a valve stem, said apparatus comprising a flexible tube adapted to be inserted through the valve stem to the lowest portion of the tire cavity for conducting fluid out of the tire, and means comprising a threaded connection for engaging the tube with the valve stem.

3. Apparatus for removing liquid from an inflatable tire having a valve stem, said apparatus comprising a flexible tube adapted to be inserted through the valve stem to the lowest portion of the tire cavity, and means for securing the tube to the valve stem.

4. Apparatus for removing liquid from an inflatable tire having a valve stem, said apparatus comprising a flexible tube adapted to be inserted through the valve stem to the lowest portion of the tire cavity, and means on said tube for engaging the valve stem.

5. Apparatus for removing liquid from an inflatable tire having a valve stem, said apparatus comprising a flexible tube adapted to be inserted through the valve stem to the lowest portion of the tire cavity, and means for sealing the tube against the valve stem.

AARON D. STEIDINGER.